United States Patent

Ji et al.

(10) Patent No.: US 12,028,110 B2
(45) Date of Patent: Jul. 2, 2024

(54) DISTRIBUTED FIBER OPTIC SENSOR PLACEMENT

(71) Applicant: NEC Laboratories America, Inc., Princeton, NJ (US)

(72) Inventors: Philip Ji, Cranbury, NJ (US); Ting Wang, West Windsor, NJ (US); Zilong Ye, LaVerne, CA (US)

(73) Assignee: NEC Corporation, Tokyo (JP)

( * ) Notice: Subject to any disclaimer, the term of this patent is extended or adjusted under 35 U.S.C. 154(b) by 77 days.

(21) Appl. No.: 17/713,171

(22) Filed: Apr. 4, 2022

(65) Prior Publication Data

US 2022/0321219 A1 Oct. 6, 2022

Related U.S. Application Data

(60) Provisional application No. 63/170,646, filed on Apr. 5, 2021.

(51) Int. Cl.
*H04B 10/27* (2013.01)
*H04Q 11/00* (2006.01)

(52) U.S. Cl.
CPC ......... *H04B 10/27* (2013.01); *H04Q 11/0062* (2013.01); *H04Q 2011/009* (2013.01)

(58) Field of Classification Search
CPC ............... H04B 10/27; H04Q 11/0062; H04Q 2011/009

USPC ........................................... 398/58
See application file for complete search history.

(56) References Cited

U.S. PATENT DOCUMENTS

| 9,641,026 | B2 * | 5/2017 | Boardman | H02J 13/00028 |
| 2019/0280767 | A1 * | 9/2019 | Haber | G01M 11/3127 |
| 2022/0046032 | A1 * | 2/2022 | Le | H04L 63/1416 |
| 2022/0147897 | A1 * | 5/2022 | Liebman | G06Q 10/06375 |
| 2022/0269349 | A1 * | 8/2022 | Nagar | G06F 3/013 |

* cited by examiner

*Primary Examiner* — Dalzid E Singh
(74) *Attorney, Agent, or Firm* — Joseph Kolodka

(57) ABSTRACT

A procedure to solve the DFOS placement problem that uses a genetic algorithm to achieve a global optimization of sensor placement. First, our procedure according to aspects of the present disclosure defines a fitness function that counts the number of DFOS sensors used. Second, the procedure uses a valid DFOS placement assignment to model an individual in the genetic algorithm. Each individual consists of N genes, where N is the number of nodes in the given network infrastructure, e.g., N=|V|. Each gene has two genomes: (1) a list of 0s and/or 1s, in which is represent the network nodes that are equipped with DFOS sensors, and 0s represent the nodes that are not equipped with DFOS sensors; (2) a list of sensing fiber routes. An individual that has smallest number of is in their genes will be considered as the strongest individual. Thirdly, the procedure randomly generates a population of individuals. After a certain number of generations of population, the strongest individual in the last generation will be the global optima for the DFOS placement assignment.

3 Claims, 7 Drawing Sheets

DISTRIBUTED FIBER OPTIC SENSOR PLACEMENT

CROSS REFERENCE TO RELATED APPLICATIONS

This application claims the benefit of Untied States Provisional Patent Application Ser. No. 63/170,646 filed 5 Apr. 2021 the entire contents of which is incorporated by reference as if set forth at length herein.

TECHNICAL FIELD

This disclosure relates generally to distributed fiber optic sensing (DFOS) systems methods and structures. More particularly, it describes methods for placement of sensor(s) in a DFOS system.

BACKGROUND

As those skilled in the art will readily appreciate, distributed fiber optic sensor systems and methods—when employed in telecommunications networks—have shown to be of great utility an provide a range of useful services such as sensing various physical parameters including temperature, vibration, strain, etc., thereby enabling a new era of Infrastructure-as-a-Sensor (IaaSr) and/or Network-as-a-Sensor (NaaSr).

When network service providers deploy such DFOS systems into existing telecommunications networks to upgrade infrastructure(s) with DFOS and provide IaaSr/NaaSr services, a critical challenge arises—where to deploy DFOS sensors and how to determine sensing fiber route(s) to provide sensory capability to the entire network infrastructure at a minimum cost of DFOS sensors.

SUMMARY

An advance in the art is made according to aspects of the present disclosure directed to methods that advantageously employ a novel procedure to solve the DFOS placement problem. As we shall show and describe, our procedure uses a genetic algorithm to achieve a global optimization of sensor placement.

First, our procedure according to aspects of the present disclosure defines a fitness function that counts the number of DFOS sensors used. Second, the procedure uses a valid DFOS placement assignment to model an individual in the genetic algorithm. Each individual consists of N genes, where N is the number of nodes in the given network infrastructure, e.g., N=V. Each gene has two genomes: (1) a list of 0s and/or 1s, in which is represent the network nodes that are equipped with DFOS sensors, and 0s represent the nodes that are not equipped with DFOS sensors; (2) a list of sensing fiber routes. An individual that has smallest number of 1s in their genes will be considered as the strongest individual. Thirdly, the procedure randomly generates a population of individuals.

After that, the procedure constructs the next generation population that has the same size, which is formed by three groups. The first group consists of the first few strongest individuals from the current generation. The second group are some new individuals randomly generated. The third group consists of the babies who are given birth by a few pairs of individuals from the current generation. In particular, gene crossover and mutation will be performed in this breeding process with a certain probability.

Finally, after a certain number of generations of population, the strongest individual in the last generation will be the global optima for the DFOS placement assignment. Compared to the existing EnP solution that search for the optima (may be local optima) in a single direction, our inventive procedure according to aspects of the present disclosure can find the global optima because it applies probabilistic search in the entire searching space when generating the next generation (e.g., the mutation and crossover is probabilistically generated).

BRIEF DESCRIPTION OF THE DRAWING

A more complete understanding of the present disclosure may be realized by reference to the accompanying drawing in which.

Figure 1:
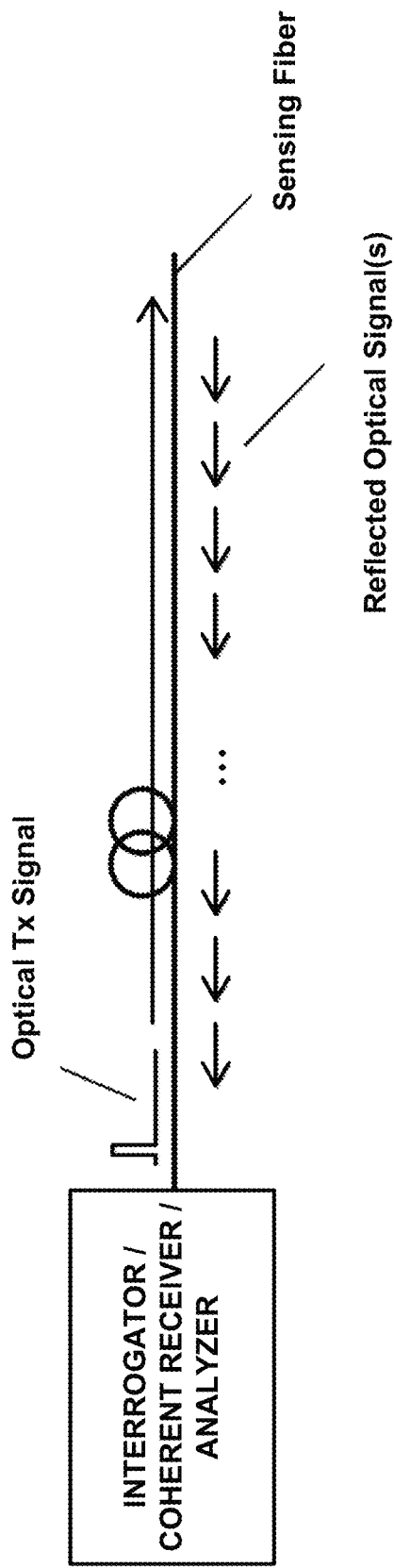
FIG. 1 is a schematic diagram of an illustrative prior art distributed fiber optic sensing system.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Fiber optic sensing measures changes in "backscattering" of light occurring in an optical sensing fiber when the sensing fiber encounters vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

A schematic diagram illustrating the generalized arrangement and operation of a prior art distributed fiber optic sensing system is shown in FIG. 1. With reference to FIG. 1 one may observe an optical sensing fiber that in turn is connected to an interrogator. As is known, contemporary interrogators are systems that generate an input signal to the fiber and detects/analyzes reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes the interrogator that periodically generates optical pulses (or any coded signal) and injects them into an optical fiber. The injected optical pulse signal is conveyed along the optical fiber.

At locations along the length of the fiber, a small portion of signal is scattered/reflected and conveyed back to the interrogator. The scattered/reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

Distributed Acoustic Sensing (DAS)/Distributed Vibrational Sensing (DVS) systems detect vibrations and capture acoustic energy along the length of optical sensing fiber. Advantageously, existing, traffic carrying fiber optic networks may be utilized and turned into a distributed acoustic sensor, capturing real-time data. Classification algorithms may be further used to detect and locate events such as leaks, cable faults, intrusion activities, or other abnormal events including both acoustic and/or vibrational.

Various DAS/DVS technologies are presently used with the most common being based on Coherent Optical Time Domain Reflectometry (C-OTDR). C-OTDR utilizes Ray back-scattering, allowing acoustic frequency signals to be detected over long distances. An interrogator sends a coherent laser pulse along the length of an optical sensor fiber (cable). Scattering sites within the fiber cause the fiber to act as a distributed interferometer with a gauge length like that of the pulse length (e.g. 10 meters), Acoustic disturbance acting on the sensor fiber generates microscopic elongation or compression of the fiber (micro-strain), which causes a change in the phase relation and/or amplitude of the light pulses traversing therein.

Before a next laser pulse is be transmitted, a previous pulse must have had time to travel the full length of the sensing fiber and for its scattering/reflections to return. Hence the maximum pulse rate is determined by the length of the fiber. Therefore, acoustic signals can be measured that vary at frequencies up to the Nyquist frequency, which is typically half of the pulse rate. As higher frequencies are attenuated very quickly, most of the relevant ones to detect and classify events are in the lower of the 2 kHz range.

In the very low frequency range, phase-based C-OTDR systems enable the highly sensitive measurement of transient temperatures due to the elongation/compression of the fiber with temperature changes. This measurement mode is called Distributed Temperature Gradient Sensing (DTGS) and is well-known in the oil & gas industry.

Distributed Temperature Sensing (DTS) uses optical sensing fiber—typically over lengths of several kilometers—that functions as linear temperature sensors. The operational result is a continuous temperature profile along the entire length of the sensor fiber. DTS utilizes a Raman effect to measure temperature. The intensity of Raman scattering is a measure of temperature along the fiber length. A Raman anti-Stokes signal changes its amplitude significantly with changing temperature.

The position or location along the length of the fiber of the temperature measurement is determined by measuring arrival timing of a returning scattered/reflected light pulse. This method involving arrival time measurement is called Optical Time Domain Reflectometry (OTDR).

Other DTS technologies use Brillouin backscatter (B-OTDR or B-OTDA), which carries strain and temperature information. Such systems are also called DTSS (Distributed Temperature and Strain Sensing), The challenge with these systems is to isolate the fiber from strain to get accurate temperature information.

With this background in place, we note once again that sensor placement—particularly in existing telecommunications networks that are being upgraded to include DFOS sensory functions such as those described above—is a problem of particular importance. As such, an advance in the art is made according to aspects of the present disclosure directed to methods that advantageously employs a novel procedure to solve the DFOS placement problem. As we shall show and describe, our procedure uses a genetic algorithm to achieve a global optimization of sensor placement.

First, our procedure according to aspects of the present disclosure defines a fitness function that counts the number of DFOS sensors used. Second, the procedure uses a valid DFOS placement assignment to model an individual in the genetic algorithm. Each individual consists of N genes, where N is the number of nodes in the given network infrastructure, e.g., N=|V|. Each gene has two genomes: (1) a list of 0s and/or 1s, in which is represent the network nodes that are equipped with DFOS sensors, and 0s represent the nodes that are not equipped with DFOS sensors; (2) a list of sensing fiber routes. An individual that has smallest number of 1s in their genes will be considered as the strongest individual. Thirdly, the procedure randomly generates a population of individuals.

After that, the procedure constructs the next generation population that has the same size, which is formed by three groups. The first group consists of the first few strongest individuals from the current generation. The second group are some new individuals randomly generated. The third group consists of the babies who are given birth by a few pairs of individuals from the current generation. In particular, gene crossover and mutation will be performed in this breeding process with a certain probability.

Finally, after a certain number of generations of population, the strongest individual in the last generation will be the global optima for the DFOS placement assignment. Compared to the existing EnP solution that search for the optima (may be local optima) in a single direction, our inventive procedure according to aspects of the present disclosure can find the global optima because it applies probabilistic search in the entire searching space when generating the next generation (e.g., the mutation and crossover is probabilistically generated).

As will become apparent to those skilled in the art, our inventive procedure according to aspects of the present disclosure advantageously optimizes the DFOS placement assignment from a global point of view. Our procedure achieves the global optima, via probabilistically searching in the entire search space and is based on a genetic algorithm, which can be easily parallelized such that it achieves global optima quickly. Importantly, our inventive procedure provides a guideline about where to place sensors to achieve fully IaaSr/NaaSr service coverage in a telecommunication network infrastructure—both existing networks and those under consideration for construction. Our procedure provides a guideline about how to determine the routing of sensing channel(s) to achieve fully IaaSr/NaaSr service coverage in the telecommunication network infrastructure, and provides a guideline about sensing range(s) for each sensing channel to achieve fully IaaSr/NaaSr service coverage in a telecommunication network infrastructure.

As we shall show and described, our inventive procedure according to aspects of the present disclosure is on a genetic algorithm. Operationally, there is a sub-procedure that adopts a random-fit way to identify a valid DFOS placement assignment. In the following, we will first introduce the steps for the random-fit sub-procedure, and then present the steps for our genetic algorithm-based procedure.

Figure 2:
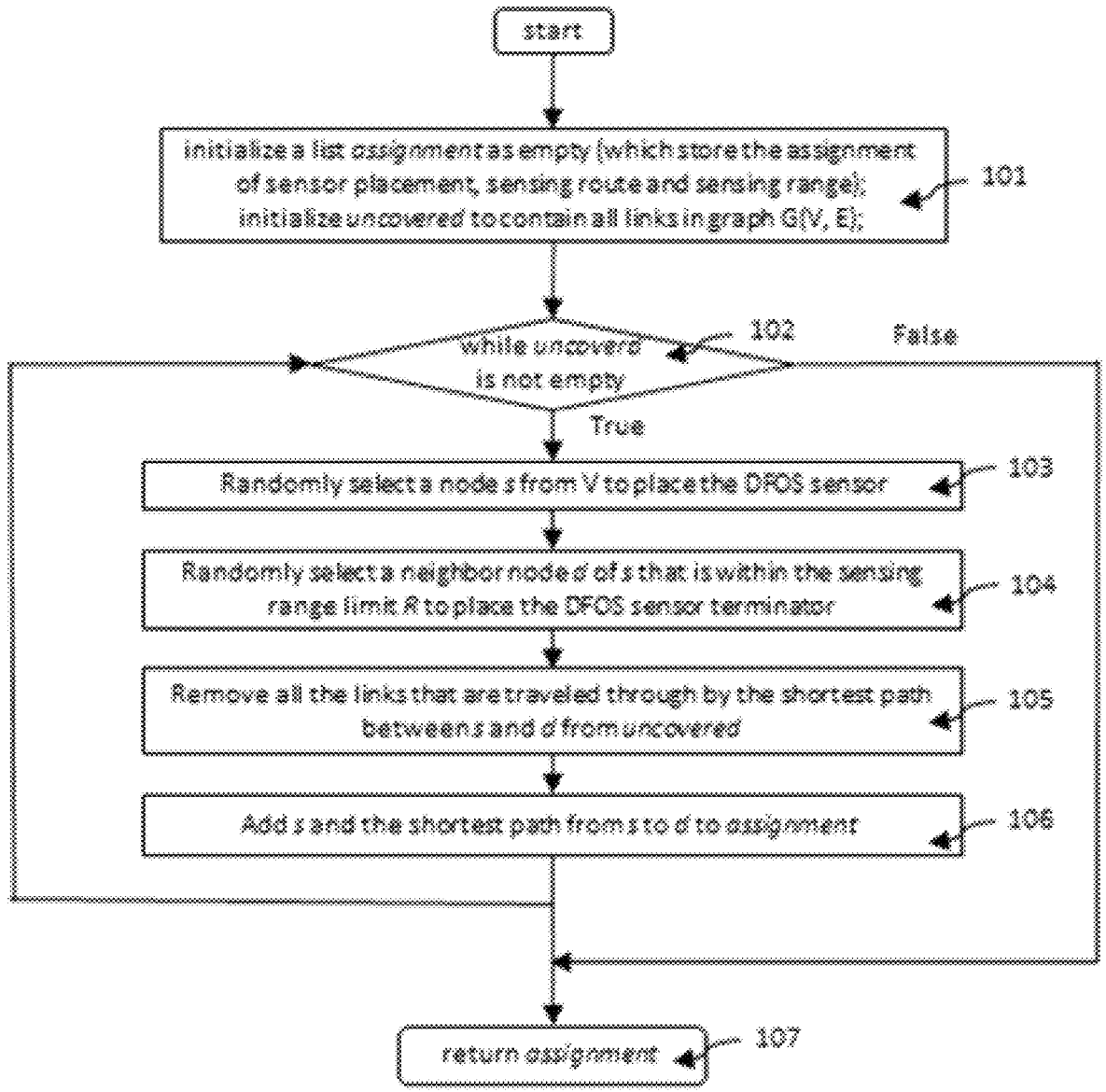
FIG. 2 is a schematic diagram illustrating a flow chart for a random-fit sub-procedure according to aspects of the present disclosure.

FIG. 2 is a schematic diagram illustrating a flow chart for a random-fit sub-procedure according to aspects of the present disclosure.

Step 101 is the initialization step. Two data structures are created. First, a list assignment is created to store the assignment of the DFOS sensor placement and the corresponding sensing fiber route assignment. Here, assignment is initialized as empty. Second, a list uncovered is created, which consists of all the links in the given network infrastructure G(V,E).

Step 102 is the entering point of a while loop. It checks whether or not the list uncovered is empty. If uncovered is not empty, it enters the while loop and continue to step 103; otherwise, if uncovered is empty, it quits the while loop and jumps to step 107.

Step 103 will randomly select a node s from V as the place to deploy the DFOS sensor.

Step 104 checks all the neighbor nodes of s. It randomly selects a neighbor node d, which has a shortest path from s to d that is within the sensing range limit R. Then, d is marked as a location to deploy the DFOS sensor terminator.

Step 105 updates list uncovered, by removing all links traveled by the shortest path from s to d from list uncovered.

Step 106 adds s and the shortest path from s to d to assignment. Here, s is the DFOS sensor placement assignment, and the shortest path from s to d is the corresponding sensing fiber route assignment.

Step 107 is the last step of the Random-Fit sub-procedure. It returns assignment to the point of execution at which this sub-procedure is called.

Figure 3A:
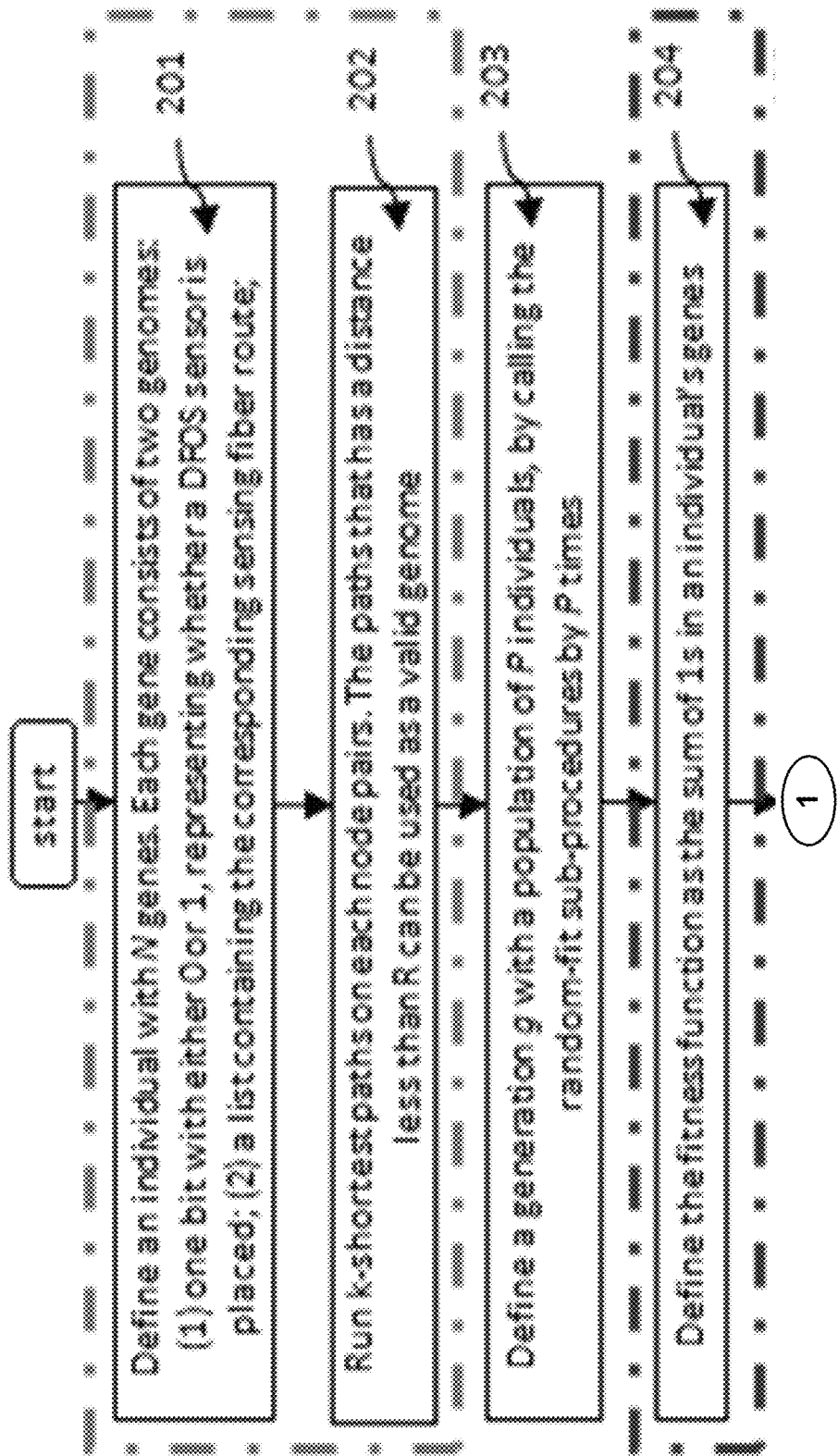
FIG. 3(A), FIG. 3(B), and FIG. 3(C) is a schematic diagram illustrating an overall flow chart showing the operational steps of our genetic algorithm according to aspects of the present disclosure.
Figure 3B:
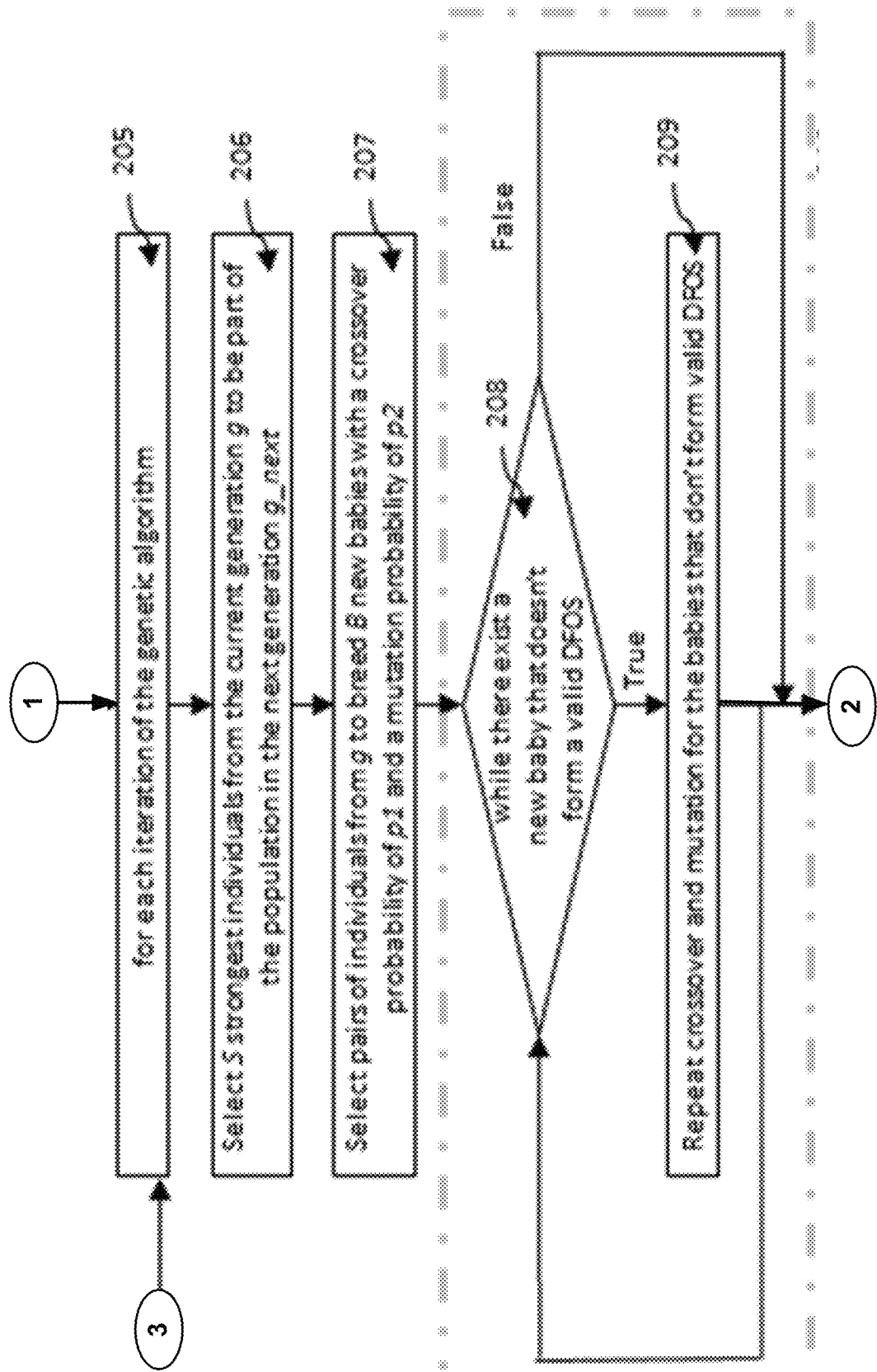
Figure 3C:
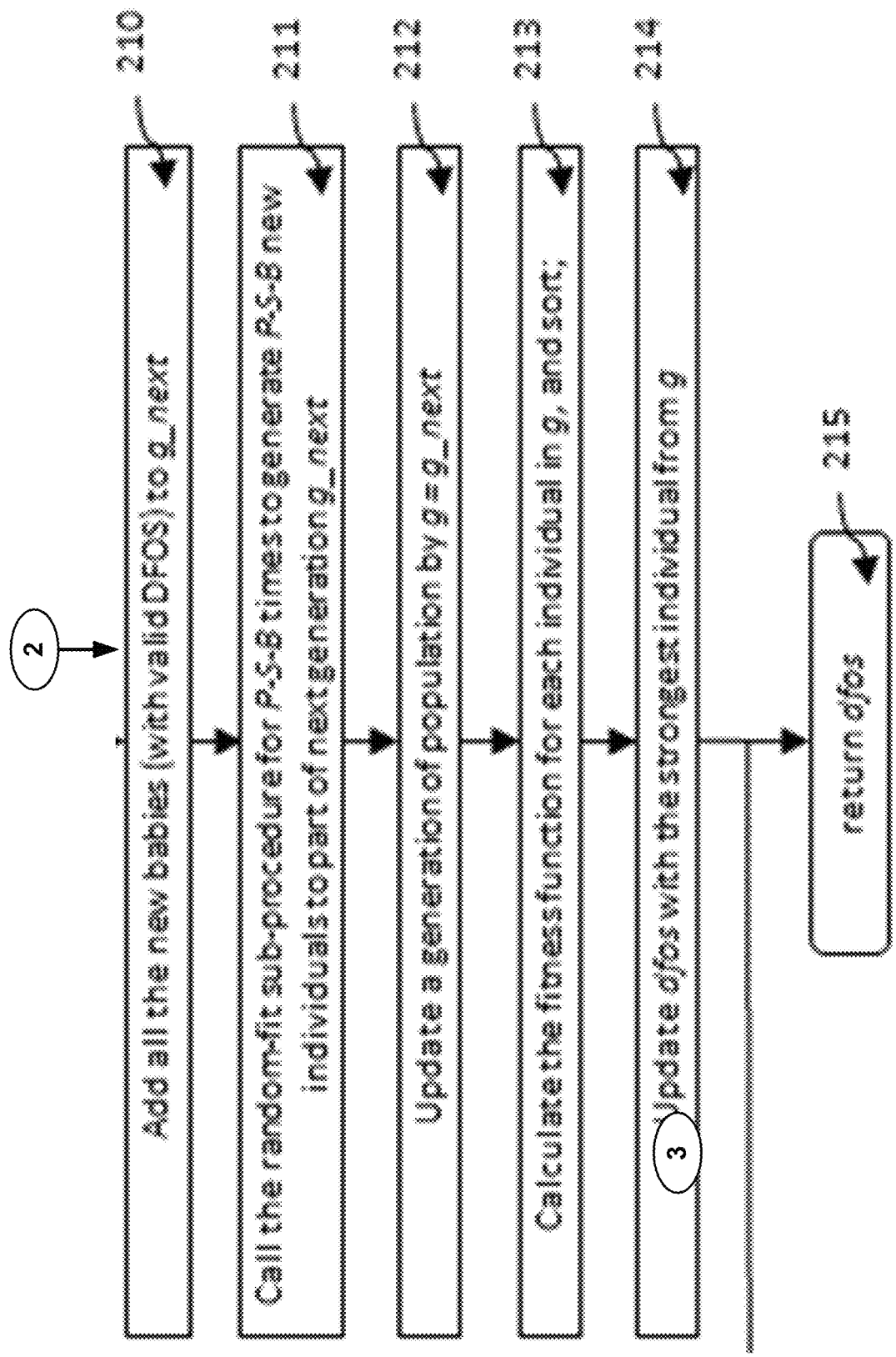

FIG. 3(A), FIG. 3(B), and FIG. 3(C) is a schematic diagram illustrating an overall flow chart showing the operational steps of our genetic algorithm according to aspects of the present disclosure.

Step 201 is the initialization entry point of the genetic algorithm based procedure, and it is one of the key steps of our inventive procedure. The procedure models the DFOS placement problem using a genetic algorithm model.

Here, a valid DFOS placement assignment is considered as an individual. Such an individual has N genes, where N is the number of nodes in the given network (e.g., N=|V|). Each gene consists of two genomes. The first genome is a list of 0s and/or 1s, where 0s represent nodes that are not equipped with a DFOS sensor and 1s represent those are equipped with a DFOS sensor. The second genome is a list of sensing fiber routes, each of which contains a number of links that it travels through.

Step 202 applies a k-shortest path algorithm on each node pairs. Among the obtained paths, the ones that have a traveling distance that is less than the sensing range limit R will be considered as valid genomes that can be used by an individual (e.g., in the process of generating random individuals, or in the process of crossover or mutation).

Step 203 creates a generation g having a population of P individuals. This step is achieved by calling the Random-Fit sub-procedure for P times to generate P valid DFOS placement assignment as P individuals. Then, the procedure applies the genetic algorithm to operate on this initial generation and iterate for a number of generations to evolve and search for a strongest individual (which represents global optimal DFOS placement assignment).

Step 204 defines a fitness function as the number of 1s in an individual's genes. Such a definition of the fitness function leads our genetic algorithm to search for the strongest individual that has the minimum number of 1s in their genes, which is the global optimal DFOS placement assignment that costs the minimum number of DFOS sensors.

Step 205 is the entry point of a for loop from step 206 to step 214. The genetic algorithm iterates for a number of generations to evolve and to locate the global optima.

Step 206 constructs the first part of population for the next generation g_next. Here, our inventive procedure selects S strongest individuals from the current generation g, and directly assigns them to a part of the population in the next generation g_next.

Step 207 constructs a second part of population for the next generation g_next. Here, our inventive procedure selects a set of pairs of individuals from the current generation g to breed B new babies for the next generation g_next. In the process of breeding new babies, gene crossover is performed with a probability of p1, and gene mutation is performed with a probability of p2. Both p1 and p2 can be tuned by the users of the procedure, depending on the actual network infrastructure.

Step 208 is the entry point of a while loop, and it is one of the key steps of the procedure. The new babies generated in step 207 may not be a valid DFOS placement assignment because of crossover and mutation. So, this step will check whether there exists a new baby from step 207 that does not form a valid DFOS placement assignment (e.g., their DFOS assignments cannot cover all the links with IaaSr/NaaSr services). If there exists such a new baby, then control proceeds to step 209; otherwise, if all the new babies can form valid DFOS placement assignment, control proceed to step 210.

Step 209 repeats the crossover and mutation for the babies who cannot form a valid DFOS placement assignment, until the condition in step 208 becomes false. After such iteration, the procedure requires that all the individuals in a generation can offer valid DFOS placement assignment, which satisfies the requirements that all the links in the given network infrastructure are covered by IaaSr/NaaSr services.

Step 210 adds all the new babies (who are already enforced to offer valid DFOS placement assignment by step 208-209) to the next generation g_next.

Step 211 constructs the third part of the population in the next generation g_next. This is achieved by calling the Random-Fit sub-procedure for P-S-B times to generate P-S-B new individuals to be part of next generation g_next. Here, we use P-S-B to make sure that each generation has the same size of population.

Step 212 updates the population in generation g by replacing it with the population in g_next.

Step 213 calculates a fitness function for each individual in generation g. Then, it sorts all individuals with respect to their fitness value.

Step 214 updates the final result dfos with the strongest individual from the current generation g. Here, the strongest individual has the smallest number of is in the genes, which corresponds to the DFOS placement assignment that costs the minimum number of DFOS sensors.

Step 215 returns dfos that includes the global optima for the DFOS placement problem.

Figure 4:
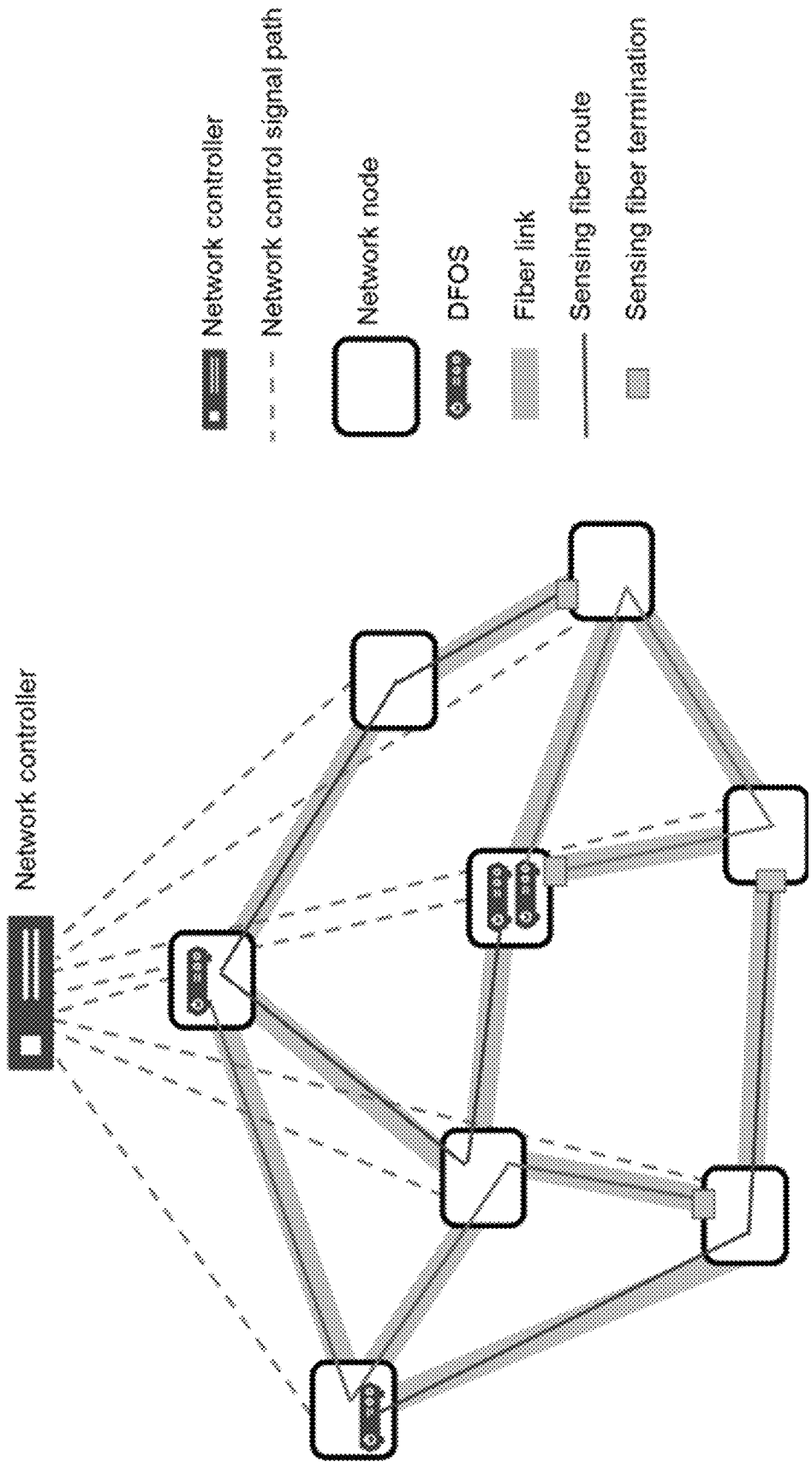
FIG. 4 is a schematic diagram illustrating an illustrative telecommunications/fiber optic sensing network and application of a DFOS placement procedure according to aspects of the present disclosure.
Figure 5:
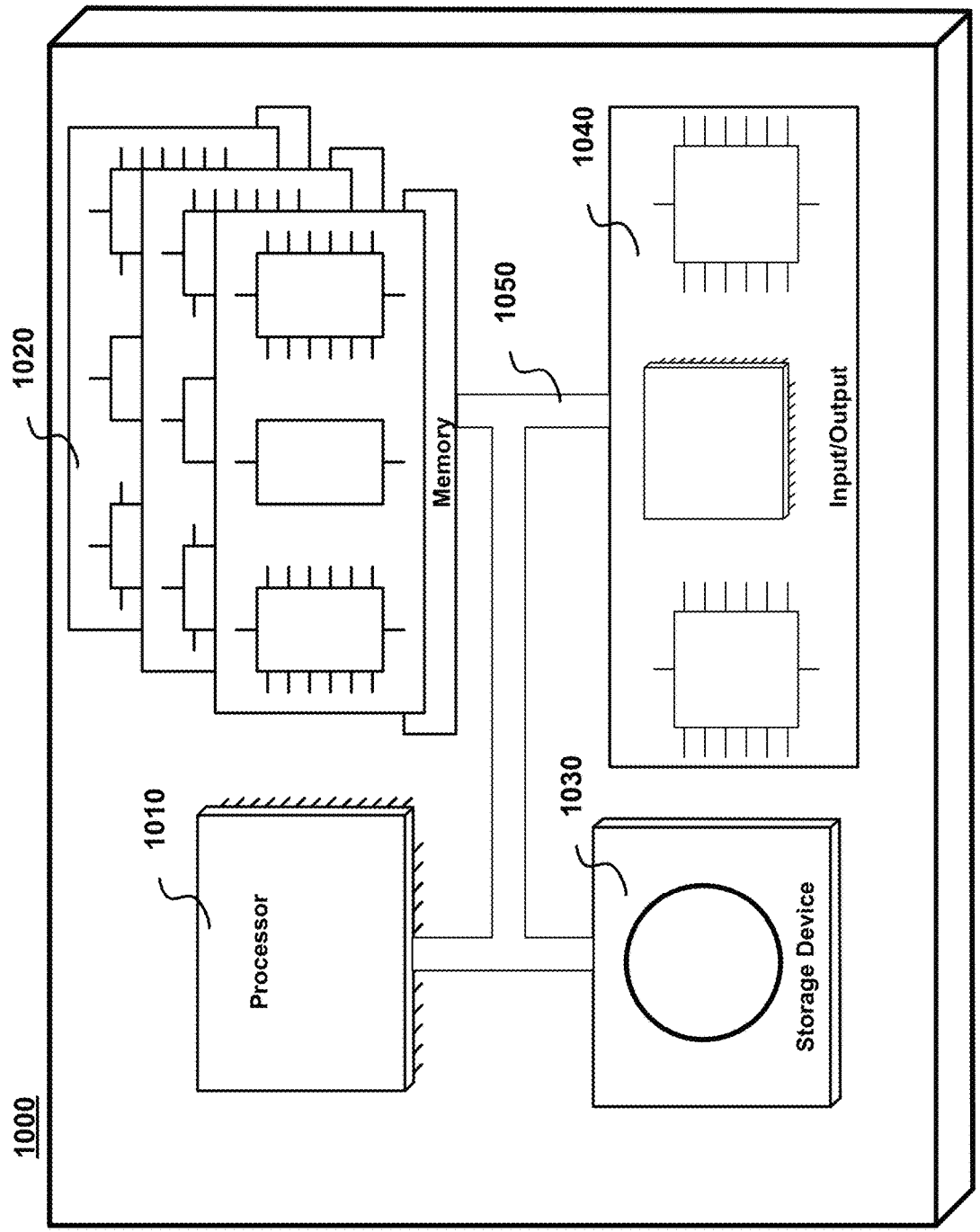
FIG. 5 is a schematic diagram illustrating a computer system that may be programmed to execute our inventive procedure according to aspects of the present disclosure.

FIG. 4 is a schematic diagram illustrating an illustrative telecommunications/fiber optic sensing network and application of a DFOS placement procedure according to aspects of the present disclosure.

As may be observed from that figure, there are multiple nodes in the fiber optic network, and there are multiple fiber optic links between certain nodes. Certain one(s) of the links are links that need to be monitored (sensed) by the DFOS sensors—which those skilled in the art may understand could be all the fiber optic links in the network.

The optical nodes are controlled by a network controller, which can be placed at one of the nodes, or can be in a remote location or multiple locations. The network information, including the network topology, information of each node, information of each link (such as the two end nodes, the link distance, whether sensing is required on this link), and so on, are collected by the network controller. Based on the information, the network controller uses the DFOD placement procedure to decide the network configuration for sensing purpose. The configuration settings are then sent to individual nodes.

When an optical node receives the respective network configuration instructions, it executes the instructions, which could include placing one or more DFOS sensor hardware elements at the node and connecting them to the respective fiber, and/or connect two fibers from two links together to form a pass-through path (this can be done via a fiber patch panel or optical switch), and/or terminate a fiber to prevent large reflection at the end surface of the termination point.

Each deployed DFOS sensor also uses the instruction from the network controller to configure the sensing distance and any related parameters, then start the on-going measurement. The collected data are separated into individual links, if the sensor's sensing range spans across multiple hops. The measure data for each fiber link can be stored and processed locally or can be sent to remote or centralized processor to be analyzed or stored.

Due to the resource optimization advantage of the DFOS placement procedure, the number of DFSO sensors in the network can be kept low, saving the hardware expense and the operation cost. Since all the required links in the network are performing sensing function continuously, the IaaSr (NaaSr) function is achieved, which will improve the network operation efficiency (such as preventing cable cut, monitoring cable health, monitoring operation environment), and bring new service and revenue to the network owner (such as providing traffic information to municipal government, monitoring road condition for highway operator, monitoring utility pole health for utility company, monitoring city noise for accident detection, etc.)

FIG. 7 shows an illustrative computer system 1000 suitable for implementing methods and systems according to an aspect of the present disclosure. As may be immediately appreciated, such a computer system may be integrated into an another system such as a router and may be implemented via discrete elements or one or more integrated components. The computer system may comprise, for example a computer running any of a number of operating systems. The above-described methods of the present disclosure may be implemented on the computer system 1000 as stored program control instructions.

Computer system 1000 includes processor 1010, memory 1020, storage device 1030, and input/output structure 1040. One or more input/output devices may include a display 1045. One or more busses 1050 typically interconnect the components, 1010, 1020, 1030, and 1040. Processor 1010 may be a single or multi core. Additionally, the system may include accelerators etc further comprising the system on a chip.

Processor 1010 executes instructions in which embodiments of the present disclosure may comprise steps described in one or more of the Drawing figures. Such instructions may be stored in memory 1020 or storage device 1030. Data and/or information may be received and output using one or more input/output devices.

Memory 1020 may store data and may be a computer-readable medium, such as volatile or non-volatile memory. Storage device 1030 may provide storage for system 1000 including for example, the previously described methods. In various aspects, storage device 1030 may be a flash memory device, a disk drive, an optical disk device, or a tape device employing magnetic, optical, or other recording technologies.

Input/output structures 1040 may provide input/output operations for system 1000.

At this point, while we have presented this disclosure using some specific examples, those skilled in the art will recognize that our teachings are not so limited. Accordingly, this disclosure should be only limited by the scope of the claims attached hereto.

The invention claimed is:

1. A computer implemented method for determining distributed fiber optic sensing (DFOS) sensor placement in an optical network including a plurality of nodes interconnected via a plurality of optical links, the method comprising:
by the computer:
   initialize an assignment list as empty and an uncovered list as containing all the optical links in graph G(V,E) where G is the graph, V is a set of vertices, and E is a set of paired vertices;
   if uncovered is not empty
      1) Randomly select a node s from V to place a DFOS sensor fiber;
      2) randomly select a neighbor node d of s that is within a sensing range limit R to place a DFOS sensor fiber terminator;
      3) remove all optical links that are traveled through by a shortest path between s and d from uncovered;
      2) Add s and the shortest path from s to d to assignment;
   repeat 1-4 if uncovered is not empty, else return assignment; and
   output an indicia of the assignment as a location in the optical network at which a DFOS sensor fiber is to be placed;
   wherein the assignment list includes an identification of assignment of DFOS sensor fiber placement, sensing route, and sensing range of a sensor fiber; and
   wherein the assignment list includes increased birefringence of the optical fiber is increased with respect to its average magnitude.

2. The computer implemented method of claim 1 FURTHER CHARACTERIZED BY a genetic algorithm for determining strongest individuals, wherein such strongest individuals each represent a location in the graph at which to place a DFOS sensor.

3. The computer implemented method of claim 2 FURTHER CHARACTERIZED BY determining strongest individuals over three generations, wherein the strongest individuals of the $3^{rd}$ generation represent locations in the graph at which to place a DFOS sensor.

* * * * *